M. CHIMINO.
MOTORCYCLE TOP.
APPLICATION FILED MAR. 31, 1919.
1,342,987.
Patented June 8, 1920.
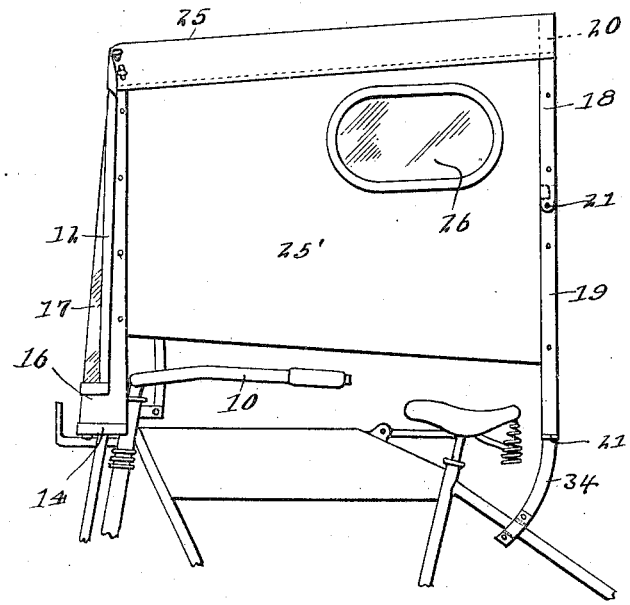
Fig. 1.
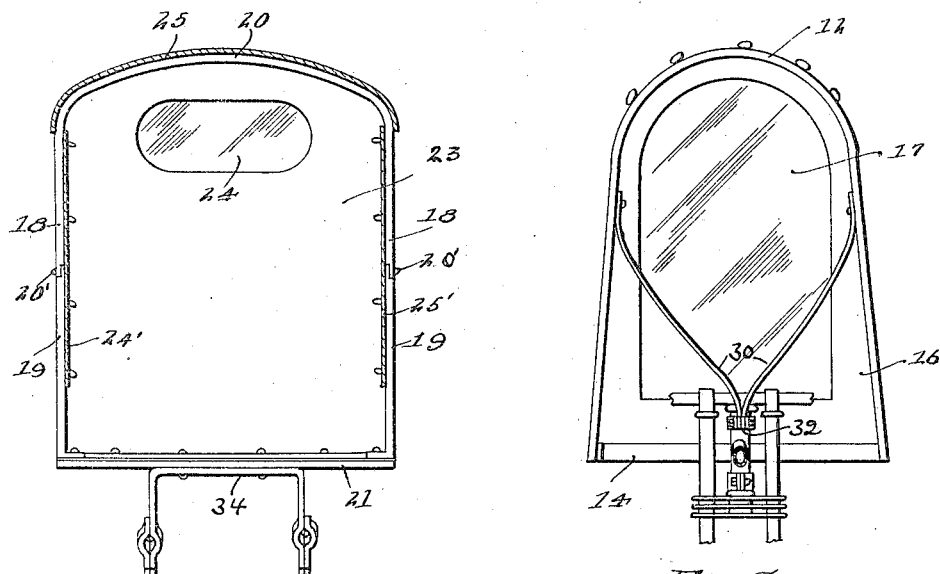
Fig. 2.
Fig. 3.
Witnesses
R. A. Thomas.
Inventor
Mike Chimino
By Victor J. Evans
Attorney

UNITED STATES PATENT OFFICE.

MIKE CHIMINO, OF BATAVIA, NEW YORK.

MOTORCYCLE-TOP.

1,342,987.  Specification of Letters Patent.  Patented June 8, 1920.

Application filed March 31, 1919. Serial No. 286,300.

*To all whom it may concern:*

Be it known that I, MIKE CHIMINO, a citizen of the United States, residing at Batavia, in the county of Genesee and State of New York, have invented new and useful Improvements in Motorcycle-Tops, of which the following is a specification.

This invention relates to a top for a motor cycle, and the object is to provide a device of the type indicated comprising a front member which may be termed a wind shield and which shall be attached to the front fork, a rear member to be attached to the frame or fork of the machine, and a top member connecting said front and rear members.

A further object is to provide in a device of the type indicated means whereby the top may be collapsed or partly collapsed, and means for attaching side curtains as in the case of an automobile top or other vehicle top.

With the foregoing and other objects in view, the invention consists in the novel construction, combination and arrangement of elements hereinafter described and claimed.

In the drawings,

Figure 1 is a view of the device in side elevation.

Fig. 2 is a vertical transverse section, looking toward the rear.

Fig. 3 is a view, in front elevation, of the forward frame.

In carrying out my invention I provide a front member which may constitute a wind shield and which shall be attached to the front fork of the machine, the handle bar being designated at 10 and the frame of the front member, or the main frame thereof being shown at 12. This frame comprises a plurality of side members parallelly arranged, and an upper arch shaped portion, and further includes a lower curved portion designated at 14.

A sheet of flexible material 16 is stretched across the frame member of the front element of the device and is provided with a transparent portion 17 through which the operator shall be able to observe the conditions ahead as in the case of an ordinary wind-shield for a motor car.

The rear frame member comprises a plurality of sections 18 and 19 pivotally connected at the points 20', permitting the collapse of the frame when the parts are to be folded back and out of the way. The rear member includes an upper arch like portion 20 and a lower horizontal member 21, the latter being secured to the frame or fork of the machine. Across the collapsible frame there is stretched the sheet of flexible material 23 provided with a window portion 24. The top 25 formed of a sheet of flexible material is connected with the rear frame in the manner shown and is detachably connected with the front frame or front members, being disconnected from said front members when the top as a whole is to be collapsed. Side curtains 24' and 25' provided with windows 26, serve the usual purpose.

The device may readily be applied, and while in use, the front member serves constantly as a wind-shield, and the remainder of the structure may be in operative or inoperative position as may be desired and depending upon the convenience of the user. There is no interference with the ordinary use of the machine nor does the operator experience any difficulty in mounting the latter. The top member as distinguished from the front and rear members, may be of sufficient length as to permit the said rear member to be placed back of the rear seat in the event that an additional seat is carried, thereby shielding or sheltering both persons on the machine.

Brackets 32 and 34 support the front and rear portions of the top, the forked arms 30 having connection with bracket 32.

The arms 30 are preferably connected with the front member at about the point shown, said member being bowed, as illustrated, and the arms being within the bowed portion.

Having thus described my invention what is claimed is:—

In a device of the class described, a front member constituting a wind shield and comprising an arch shaped frame and a sheet of flexible material stretched across said frame and provided with a window opening, said front member also including securing devices for a top, and being bowed outwardly around the upper portion of the front fork of the machine and the handle bar, a rear frame member and means for connecting the latter with the rear portion of the machine frame, means for connecting the front member with the front fork and comprising a pair of upwardly diverging arms connected with the front member at opposite sides thereof and approximately midway of the upper and lower portions of the front member and flexible means connecting the front member and rear frame member.

In testimony whereof I affix my signature.

MIKE CHIMINO.